UNITED STATES PATENT OFFICE.

EDWARD L. PERRY, OF PATERSON, NEW JERSEY.

COMPOSITION FOR PRINTERS' INKING-ROLLERS.

SPECIFICATION forming part of Letters Patent No. 630,517, dated August 8, 1899.

Application filed April 5, 1899. Serial No. 711,824. (No specimens.)

*To all whom it may concern:*

Be it known that I, EDWARD L. PERRY, a citizen of the United States, residing at Paterson, in the county of Passaic and State of New Jersey, have invented certain new and useful Improvements in Composition for Printers' Inking-Rollers; and I do hereby declare that the following is a full, clear, and exact description of the same.

The present invention has for its object to provide a composition for printers' inking-rollers in which the roller will be perfectly free from all defects of a spongy or cellular nature and possess a soft yielding surface with the necessary suction to take up the ink and distribute the same evenly on the type, such roller being readily cleaned with ordinary soap and water without the use of naphtha or other like cleaning fluids and will not be affected by heat or cold and its lasting qualities materially enhanced.

The several ingredients of the composition of which my improved roller is composed consist as follows: crude india-rubber, twenty-eight parts; whiting, fifty-nine parts; dry lead, eleven parts; sulfur, two parts. The crude india-rubber after being vulcanized gives to the composition the required toughness and necessary elasticity. The whiting is used as a "filler" to give to the compound or composition the required body. The dry lead is employed as a drier to aid in the vulcanization, and the sulfur as a vulcanizing agent. The corn-oil is not used as a drier, but to deaden the elasticity of the composition to the required extent to produce a soft yielding surface necessary to take up and distribute the ink with the proper suction qualities, the constituent parts composing this oil rendering it especially adapted to the purpose. To the above ingredients are added from twenty-one to forty-two parts of corn-oil and the whole thoroughly mixed together in one mass, after which it is molded into the desired shape and subjected to either a steam or dry heat of not less than 260° Fahrenheit until properly vulcanized.

Having now fully described my invention, what I claim as new, and desire to secure by Letters Patent, is—

A composition for printers' inking-rollers consisting of crude india-rubber, whiting, dry lead, sulfur, and corn-oil in substantially the proportions named.

In testimony that I claim the above I have hereunto subscribed my name in the presence of two witnesses.

EDWARD L. PERRY.

Witnesses:
L. C. HILLS,
RAY TAYLOR.